Sept. 20, 1966  A. W. HODGSON  3,273,425
MACHINE TOOL PECKING DEVICES
Filed Aug. 3, 1964  3 Sheets-Sheet 1

INVENTOR:
ALBERT WARMINGHAM
HODGSON
BY Kenwood Ross
ATTORNEY.

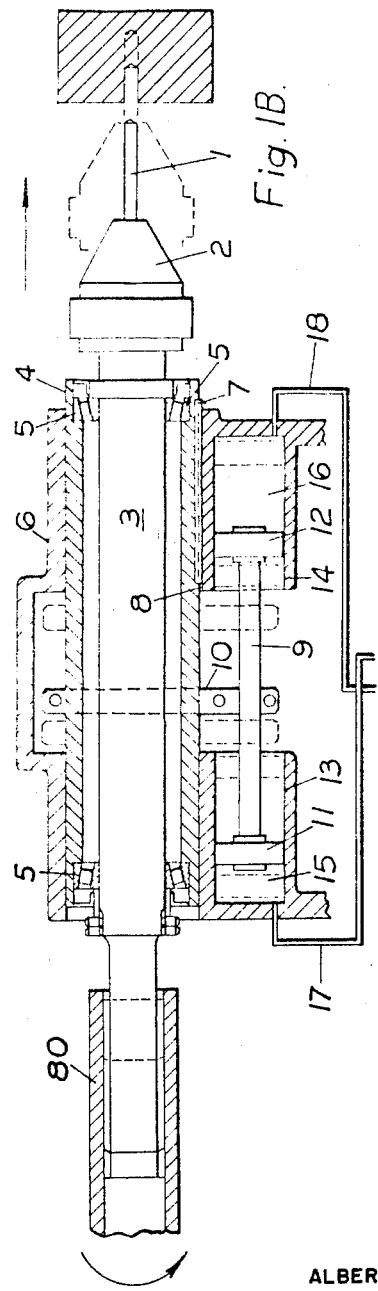

United States Patent Office 3,273,425
Patented Sept. 20, 1966

3,273,425
MACHINE TOOL PECKING DEVICES
Albert Warmingham Hodgson, 2 Rope Lane,
Wistaston, Crewe, England
Filed Aug. 3, 1964, Ser. No. 386,926
Claims priority, application Great Britain, Sept. 4, 1963,
34,863/63
17 Claims. (Cl. 77—32.3)

The present invention relates to a machine tool making device and equally to a machine tool including the device.

It is normally necessary to withdraw the working surface of a machine tool from a surface being worked in order to remove the swarf, during the working of the worked surface and in many cases it is necessary to do so at regular intervals. This periodic withdrawing is referred to as "pecking" and is essential when drilling a hole of narrow bore relative to its length which is why so much reference is made herein to drills and drilling operations. However, it must be emphasized that pecking is applicable to other machine tool operations than drilling.

According to the present invention there is provided a machine tool pecking device comprising a fluid operated double acting piston and cylinder arrangement connected to a fluid-operated self-sustaining timing device for reciprocal movement of one part of said piston and cylinder under timed control of said timing device, pecking drive take-off means attached to said movable one of said piston and cylinder and means for adjustably loading said moving one of said piston and cylinder in at least one direction of movement thereof.

The present invention also provides a machine tool including a machine tool pecking device as described above.

Figure 1A:
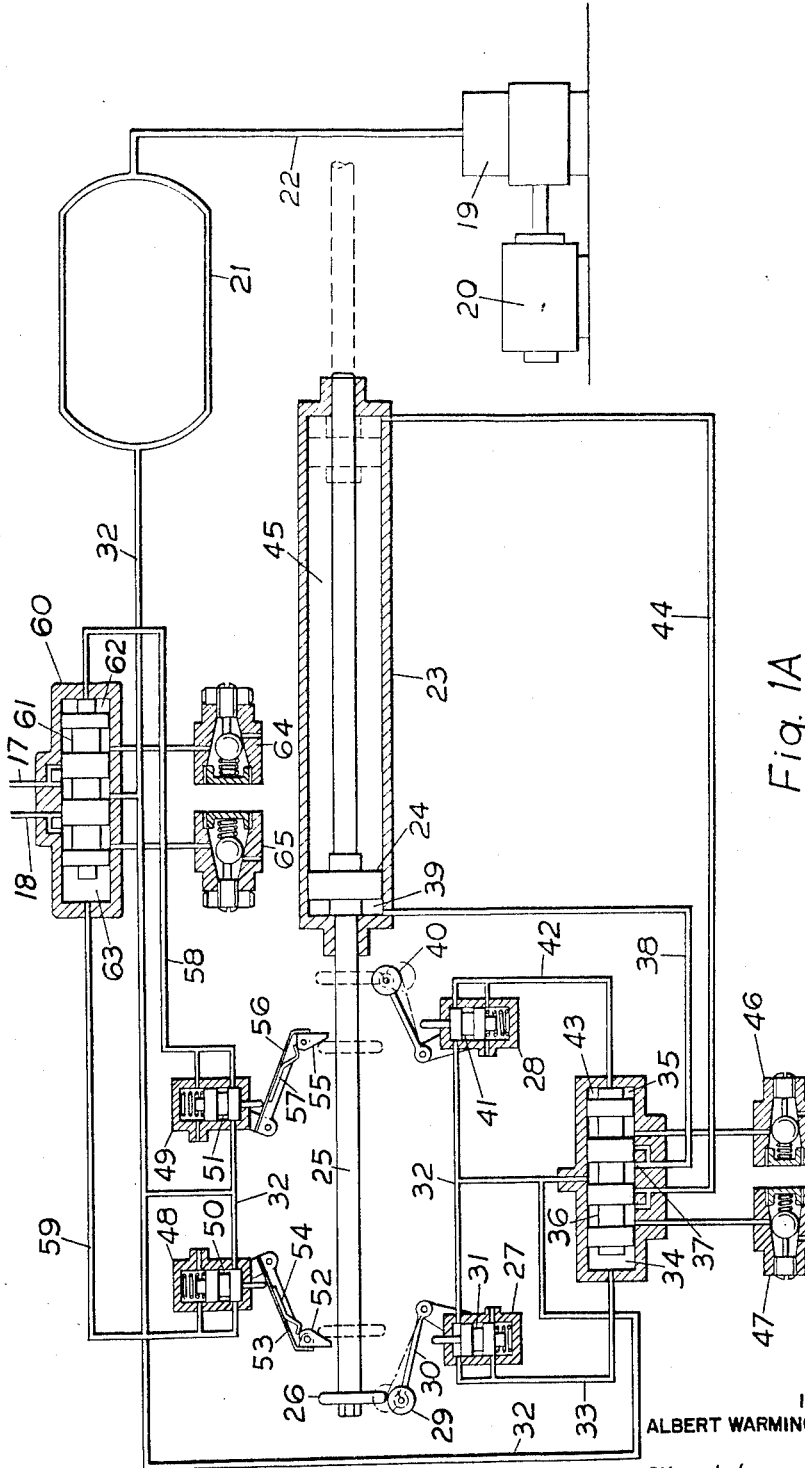
Figure 2:
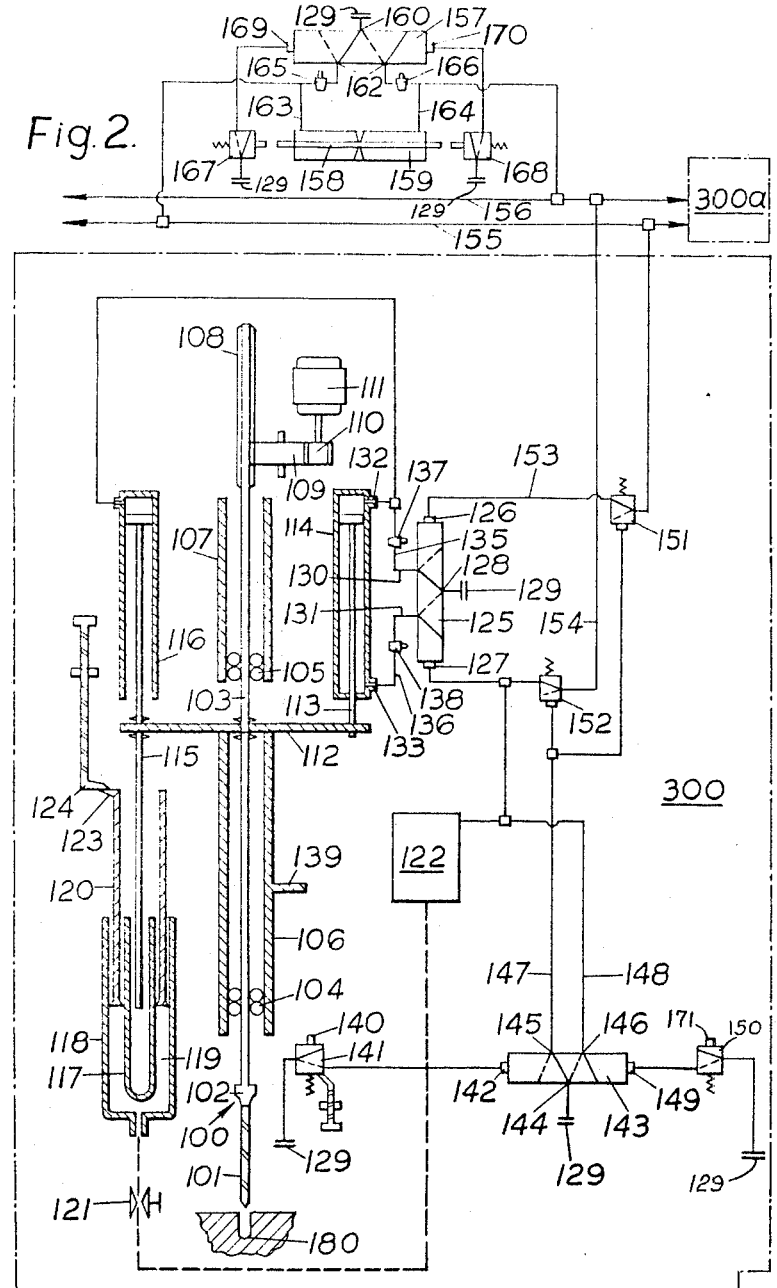

The invention will be described further with reference to two forms of machine tools including machine tool pecking devices according to the present invention as illustrated in the accompanying drawings in which:

FIG. 1 is a diagrammatic representation of a machine tool, in this case a drill, including a machine tool pecking device according to the present invention, the figure being in two parts 1A and 1B; and FIG. 2 is a schematic view of another form of machine tool, again a drill including a second form of machine tool pecking device according to the present invention.

Referring to FIG. 1, a machine tool drilling machine has a drilling head comprising a drill 1 held in a chuck 2 which is integral with quill 3 which is contained in a sleeve 4 in which it can rotate in bearings 5 but is restrained from endwise movement thereto.

The sleeve 4 is free to slide in the fixture 6 in which it is restrained from rotation by the key 7 engaging in keyway 8.

The sleeve 4 is rigidly attached by a yoke 10 to the piston rod 9 which has pistons 11 and 12 attached to the ends thereof and which are free to slide in cylinders 13 and 14 and into the closed ends 15 and 16 of which are admitted pipes 17 and 18.

The quill 3 is driven rotationally by any suitable means indicated diagrammatically by a rotating sleeve 80.

Pressurised air with which to actuate the system is provided by an air compressor 19 which is driven by any suitable means but herein for example, by an electric motor 20. The air is stored under pressure in cylinder 21 to which it is conveyed by pipe 22.

A cylinder 23 has a piston 24 and piston rod 25, the latter passing through the closed ends of cylinder 23. At one outer end of the piston rod 25 is attached a disc 26 which at or near the ends of the strokes of the piston rod, operates valves 27 and 28.

In FIG. 1 the disc 26 is shown engaging the wheel 29 of lever 30 of 3-way valve 27 causing the piston 31 of valve 27 to be moved to a position which allows air under pressure from cylinder 21 to pass along pipes 32 and 33 and to enter chamber 34 of the valve 35 and so to move the piston 36 thereof to uncover port 37. Pressurised air is allowed to pass through pipes 32 and 38 to the chamber 39 causing the piston 24 and the piston rod 25 to move to the right (as seen in the drawing).

At or near the completion of the stroke of the piston rod 25, the disc 26 contacts the wheel 40 on the actuating arm of 3-way valve 28 and by moving piston 41 allows pressurised air from cylinder 21 to pass through pipes 32 and 42 to chamber 43 of shuttle valve 35. The piston 36 of this valve is moved back to its initial position and pressurised air passing along pipes 32 and 44 enters chamber 45 of cylinder 18 causing the piston 24 to be moved back to its initial position. In this manner is the cycle repeated.

The exhausted air from chambers 39 and 45 passes through exhaust passages in shuttle valve 35 to the restriction valves 46 and 47, respectively. By varying the sizes of the orifices of these restriction valves the periodic time of each stroke of the piston rod 25 can be modified.

The disc 26 in moving from its initial position shown in FIG. 1 contacts toggle-head 52 of lever 53 of 3-way valve 48. The said toggle head 52 is so arranged that it moves away from disc 26 and the lever 53 is not actuated. Further travel brings the disc 26, to the toggle head 55 of lever 56 of 3-way valve 49. The toggle head 55 is so arranged that, when approached from the direction shown in FIG. 1, it remains rigid with the arm 56 which is caused to move and in so doing moves valve 51 of 3-way valve 49 to allow pressurised air from cylinder 21 to pass through pipes 32 and 58 to the chamber 62 of the shuttle valve 60 which, in turn, causes valve 61 to move and so allow pressurised air from cylinder 21 to pass along pipes 32 and 18 to the chamber 16 of cylinder 14 causing the piston 12 and the piston rod 9 to move to the left and the drill 1 to be retracted from the component being drilled.

Further movement of the piston rod 25 brings it to the outward end of its stroke where it actuates the valve 28 as previously described and the motion of the piston rod 25 is reversed.

The toggle head 55 of the 3-way valve 49 is so arranged that the disc 26 will pass by it without actuating the said valve. The motion of the piston rod 25 continues until the disc 26 encounters the toggle head of the 3-way valve 48. When approached from this direction, the toggle head 52 resists the movement of the disc 26 and causes the lever 53 to be deflected and valve 50 to be depressed, so allowing the pressurised air to pass through pipes 32 and 59 to chamber 63 of the shuttle valve 60. The piston 61 is caused to move and to allow pressurised air to pass through pipes 32 and 17 to chamber 15 of cylinder 13 so causing the motion of the piston 11 and piston rod 9 to be reversed and the drill 1 is moved towards the component to be drilled.

The exhausted air from chambers 15 and 16 passes through variable restriction valves 64 and 65, respectively. By varying the restrictions of these two valves the rate of travel of the piston rod can be varied both for the inward and outward strokes. Hence, the stroke periodic time of the drill both towards and from the component to be drilled can be varied for any given periodic time of the stroke of the slave piston rod 25.

The foregoing is but one embodiment of the invention.

In another form of the invention, it is envisaged that the 3-way valves 27 and 28 could be replaced by electrical switches which, when closed, would cause the electrical circuits of two solenoids, one at each end of shuttle valve 35 to be energized.

In a similar manner electrical switches, having toggle heads, could replace the 3-way valves 48 and 49 to energise solenoids at each end of shuttle valve 60.

The 3-way valves may be disposed anywhere along the path of the disc 26. Also the positions of the levers of the said valves 27 and 28 may be changed.

Referring now to FIG. 2, which illustrates schematically a more compact development of the machine of FIG. 1, this machine tool drilling machine has a drill head 100 comprising a drill 101 mounted in a chuck 102 which is integral with a quill 103 mounted in bearings 104, 105, in a first sleeve 106 and a second sleeve 107.

The end of the quill 103 remote from the chuck 102 is provided with long splines 108 which are engaged with an idler cog 109 which in turn is engaged by a driving cog 110 powered by a motor 111. By this arrangement, the quill 103 can be rotated about its axis by the motor 111, and can be moved longitudinally along its axis independently of its rotation.

The sleeve 107 is fixed while the sleeve 106 is mounted for movement parallel to the axis of the quill 103 but is prevented from rotation. The quill 103 can rotate within both of the sleeves 106, 107.

The sleeve 106 is rigidly connected to a yoke 112 normal to the axis of the quill 103 and tied to the quill 103 insofar as movement axially of the quill 103 is concerned, but the quill 103 is free to rotate with respect to the yoke 112.

The yoke 112 is also connected to a double acting piston 113 contained within a cylinder 114 and a single acting piston 115 contained within a cylinder 116. In this way the two pistons 113, 115 are tied for synchronous movement with respect to each other and with respect to the yoke 112, the sleeve 106 and the quill 103 insofar as movement parallel to its axis is concerned.

The single acting piston 115 extends beyond the yoke 112 and enters a stationary blind inactive cylinder 117. This cylinder 117 together with a stationary coaxial surrounding cylinder 118 forms an annular cylinder 119 for a floating annular piston 120. The cylinder 119 is oil filled and the oil can pass through an adjustable throttle 121 to an oil reservoir 122.

The yoke 112 extends to engage all the rim of the floating piston 120 and one part of the free end of the floating piston 120 is provided with a nose 123 which can impinge on an adjustable limit stop 124 which is mounted clear of the yoke 112.

The single acting piston cylinder 116 is connected for flow of pressurised air with the corresponding side of the double acting piston cylinder 114 so that they are powered for movement towards the floating piston 120 in synchronism. (For ease of reference pressurised air lines are shown in continuous lines while oil lines are shown in broken line.)

A shuttle valve 125 controlled by two end pilot valves 126, 127, is mounted close to the double acting piston cylinder 114, the single port 128 of the shuttle valve 125 being connected to a pressurised air source 129 and the double ports 130, 131, on the other side of the shuttle valve being connected respectively to the input ports 132, 133, to the double acting piston cylinder 114. The connecting air lines 135, 136, from the shuttle valve 125 to the cylinder 114 each contain adjustable valves 137, 138.

The pilot valve 126 which operates the shuttle valve 125 to drive the piston 113 toward the floating piston 120 is smaller in area than the opposite pilot valve 127 so that if both pilot valves 126, 127 are operated simultaneously the system moves away from the floating piston 120.

The sleeve 106 carries a nose 139 which can engage the operating button 140 of a spring return valve 141 at the limit of the travel of the sleeve 106 in the direction toward the floating piston 120. One side of the valve 141 is connected to the pressurised air source 129 and the other side of the valve is connected to one pilot valve 142 of a shuttle valve 143. The valve 141 is mounted for adjustable movement axially of the quill 103.

The single port 144 of the shuttle valve 143 is connected to the pressurised air source 129 and the double ports 145, 146, of the shuttle valve 143 are connected respectively to two pressurised air lines 147, 148. The other pilot valve 149 of the shuttle valve 143 is connected to one side of a spring return valve 150, the other side of which is connected to the pressurised air source 129. For ease of reference the valve 141 is referred to as a stop valve and the valve 150 is referred to as a start valve.

The pressurised air line 147 is connected to a pair of spring loaded valves 151, 152, one in a pressurised air line 153 to the smaller pilot valve 126 of the shuttle valve 125 and the other to a larger pilot valve 127 of the shuttle valve 125. These valves 151, 152, are loaded to to be open only when pressurised air is admitted to air line 147.

The pressurised air line 148 is connected to the oil reservoir 122 above the oil level therein and to the pressurised air line 154 to the larger area pilot valve 127 of the shuttle valve 125 between that pilot valve 127 and the valve 152.

The apparatus so far described is shown within a chain dotted rectangle and can be regarded as a unit 300 on its own and to save complication of the drawing an identical unit 300a is represented diagrammatically by a small chain dotted square in the upper right hand corner of the drawing.

The pressurised air lines 153, 154, connect with pressurised air distribution lines 155, 156 which are fed from an air operated self-sustaining timing device.

This device comprises a shuttle valve 157 and a double acting piston 158 and cylinder 159.

The single port 160 of the shuttle valve 157 is connected to the pressurised air source 129 and the double ports 162 of the shuttle valve 157 are connected respectively by air line 163 to one side of the cylinder 159 and by air line 164 to the other side of the cylinder 159.

Both these air lines 163, 164 contain adjustable valves 165, 166.

The piston 158 extends through both ends of the cylinder 159 and engages respective spring return valves 167, 168, at the limits of its travel. These valves 167, 168 are similar to spring return valves 141, 150, 151 and 152, one side of each being connected to the pressurised air source 129 and the other side being connected to respective pilot valves 169, 170 of the shuttle valve 157.

This timing device on its own will reciprocate with a period determined by the adjustment of the valves 165, 166 because it reverses itself automatically each time the piston 158 engages one of the valves 167, 168, since this engagement reverses the position of the shuttle valve 157 and hence reverses the direction of movement of the piston 158.

The pressurised air lines 163, 164 between the shuttle valve 157 and the cylinder 159 are connected individually to the pressurised air distribution lines 155, 156. These lines 155, 156 can be connected to any reasonable number of units 300, 300a, such as the one shown in full 300 and the one shown diagrammatically by the chain dotted square 300a.

When the button 171 of start valve 150 is pressed, a short pulse of air drives the shuttle valve 143 to the position shown which holds open the valves 151, 152 connecting the timing device distribution lines 155, 156, to the shuttle valve 125.

As a result of this the shuttle valve 125 reciprocates in synchronism with the timing device and consequently, reciprocates the single acting piston 115 and the double acting piston 113 in synchronism with each other, the shuttle valve 125 and the timing device.

As the pistons 113, 115 are driven towards the floating piston 120, there will be little resistance to such travel until the yoke 112 contacts the floating piston 120 whereat the resistance to travel will increase rapidly as oil is forced through the throttle 121 to the reservoir 122.

The amount of this resistance is controlled by the setting of the throttle 121.

When the timing device reverses, the shuttle valve 125 will reverse and the double acting piston 113 will be driven in the reverse direction. This takes the single acting piston 115 with it since they are tied by the yoke 112 but the floating piston 120 will remain at the position at which it was disengaged by the yoke 112.

In due course, the timing device and the shuttle valve 125 will reverse, driving both pistons 113, 115 towards the floating piston 120 until the yoke 112 once again engages the floating piston 120.

Since the period of oscillation of the system is fixed by the timer, it will be apparent that the movement of the quill 103 as governed by the pistons 113, 115 comprises an initial rapid travel towards the floating piston 120, a slower travel when the yoke 112 is in contact with the piston 120 (which travel will be made even slower when the drill 101 contacts the working surface 180), and a fast return movement. Since the position of increased loading depends on the position at which the yoke 112 contacts the floating piston 120, the limit of the travel of the system in the direction toward the floating piston 120 moves progressively in this direction though the withdrawal is completed in each reciprocation providing that the valves 137, 138 are sufficiently opened.

When the nose 139 contacts the valve button 140, the shuttle valve 143 is reversed connecting the reservoir 122 and the large area pilot valve 127 to the live air source 129 and removing pressure from the valve 151, 152 so that they close.

In this way, the timing device is disconnected from the shuttle valve, the shuttle valve 125 is set immediately into the position in which live air is admitted to the double acting cylinder 114 to drive the piston 113 away from the floating piston 120 and the oil is driven from the reservoir 122 through the throttle 121 to return the floating piston 120 until it engages with the adjustable stop 124. In this position the system is at rest unil the button of the start valve 150 is again actuated.

It will be apparent that a single timing device can control the operation of a plurality of machine tool pecking devices 300, 300a although each individual machine tool pecking device can be adjusted for individual operation subject to the timing of the timing device by adjustment of the valves 137, 138, the limit stops 124, 141 and the throttle 121.

The system has been shown with the cylinders 114, 116 fixed and the pistons 113, 115 moving but it must be apparent that the pistons could be fixed and the cylinders moving in which case the cylinders and not the pistons are connected to the yoke.

The arrangement for stopping the pecking action and returning the drill to its start position as a result of the nose 139 actuating the valve 141 can be modified by causing the yoke 112 to actuate the valve 141 to inject air into the cylinder 114 through the port 133 to return the pistons 113 with the drill to its start position.

A further valve (not shown) would then be provided for actuation by the yoke 112 on attaining its rest position to isolate the drill from the timer and to return the floating piston 120 to its start position. In this case the pilot valves 126, 127 are the same size.

It will be appreciated that the described operation of the floating piston, is to a certain extent theoretical to the extent that it does not in practice remain static when disengaged by the yoke 112. This is because it is almost impossible to remove all the air from the oil. As a result of this, there is a slight recoil of the floating piston when it is released.

However, there is an advantage in this recoil since it serves to slow the drill just before it reaches the worked surface 180 instead of slowing the drill as it reaches the worked surface. This protects the drill which is long and thin. Consequently, it is advantageous to introduce air into the oil by including an air filled resilient sachet into the annular cylinder or by some other method.

From a practical point of view, it will be appreciated that the parts of the drill unit 300 can be mounted one above the other, say, that is across FIG. 2 as shown, whereby the units 300, 300a can be placed side by side to drill simultaneously at relatively close centers. In other words, a bank of drills can be used, side by side, to produce holes of say 2½-inch center separation.

All the units can be driven from the one timer and it is possible to arrange that the timer can be stopped when all the drills are returned to their respective start positions, or, preferably, that the workpieces are retained locked in position until the last drill is returned to its start position and disconnected from the timer.

There is a big advantage in using a fluid operated system (save for the floating piston) throughout having a single pressurised air source.

If the air pressure of the source decreases, the timer, pecking frequency and drill speed will all slow down, and of the air pressure increases, all will speed up so that the depth to which the drill goes on each peck automatically tends to remain constant.

I claim:

1. In a machine tool including a working head, means mounting said working head for working movement thereof and simultaneously for movement toward and away from a working position, and means for imparting a working movement to said working head; a machine tool pecking device comprising a fluid operated, double-acting actuating piston and cylinder means, a fluid operated, self sustaining timing device, link means connecting said timing device to said actuating piston and cylinder means controlling the movement of the moving part of said actuating piston and cylinder means with respect to time from said timing device, variable loading means actuable on said moving part of said actuating piston and cylinder means in one direction of movement of said moving part thereof, and pecking drive take-off means connected to said moving part of said actuating piston and cylinder means and to said working head transmitting the movement of said moving part of said actuating piston and cylinder means to said working head to move said working head toward and away from said working position.

2. In a machine tool including a working head, means mounting said head for working movement thereof and simultaneously for movement thereof towards and away from a working position; fluid operated, self sustaining timing means, fluid distribution means connected to said timing means and distributing fluid in selectively reversible senses in timed desponse to said timing means, fluid operated, double-acting actuating piston and cylinder means connected to said timing means and reciprocable in timed relation with respect to said timing means, loading means associated with said moving part of said actuating piston and cylinder means and operable thereon in one direction of movement thereof and pecking drive take-off means tied to said moving part of said actuating piston and cylinder means and to said working head, said direction corresponding to movement of said working head to its working position.

3. In a machine tool including a working head, means mounting said head for working movement thereof and simultaneously for movement thereof towards and away from a working position; a machine tool pecking device comprising a fluid operated, double-acting actuating piston and cylinder means, a fluid operated, double-acting timing piston and cylinder means, feed back valve means actuable by said moving part of said timing piston and cylinder means at the limits of movement thereof reversing the direction of movement of the moving part of said timing piston and cylinder means, a pressurised operating fluid source connected to said timing piston and cylinder means and to said feedback valve means, fluid flow means connecting said timing piston and cylinder means to said actuating piston and cylinder means, first adjustable throttle means connected to and controlling the flow of fluid through said actuating piston and cylinder means in one direction of movement of said moving part thereof, second adjustable throttle means connected to and controlling the flow of fluid through said actuating piston and cylinder means in the other direction of movement of said moving part thereof, and pecking drive take-off means connected to said moving part of said actuating piston and cylinder means and to said working head transmitting the movement of said moving part of said actuating piston and cylinder means to said working head moving said working head towards and away from said working position.

4. In a machine tool including a working head, means mounting said head for working movement thereof and simultaneously for movement thereof towards and away from a working position; fluid operated self sustaining timing means, fluid distribution means connected to said timing means and distributing fluid in selectively reversible senses in timed response to said timing means, fluid operated double-acting actuating piston and cylinder means connected to said fluid distribution means and reciprocable in timed relation with respect to said timing means, a common pressurised fluid source connected to each said fluid operated part of said machine tool variable loading means actuable on said moving part of said actuating piston and cylinder means in one direction of movement thereof and pecking drive take off means tied to said moving part of said actuating piston and cylinder means and to said working head, said direction corresponding to movement of said working head towards its working position.

5. In a machine tool including a working head, means mounting said head for working movement thereof and simultaneously for movement thereof towards and away from a working position; fluid operated, double acting timing piston and cylinder means, feed back valve means connected for controlled flow of fluid to said timing piston and cylinder means and actuable by the moving part of said timing piston and cylinder means for reversing the fluid flow through said timing piston and cylinder means, timing throttle means connected to said timing piston and cylinder means and to said feed back valve means controlling the rate of flow of fluid through said timing piston and cylinder means, fluid operated, double-acting actuating piston and cylinder means, reversing valve means connecting said actuating piston and cylinder means to said timing means, floating piston means associated with and engageable by the moving part of said actuating piston and cylinder means in one direction of movement only thereof, liquid loading means connected with said floating piston means loading against movement in the direction in which said floating piston is engaged by said moving part of said actuating piston and cylinder means, and pecking drive take-off means tied to said moving part of said actuating piston and cylinder means and to said working head, said direction corresponding to movement of said working head towards its working position.

6. In a machine tool including a working head, means mounting said head for working movement thereof and simultaneously for movement thereof towards and away from a working position; a machine tool pecking device comprising a fluid operated, double-acting actuating piston and cylinder means, a fluid operated, double-acting timing piston and cylinder means, feedback valve means actuable by said moving part of said timing piston and cylinder means at the limits of movement thereof reversing the direction of movement of the moving part of said timing piston and cylinder means, stop means adjustably mounted on said moving part of said timing piston and cylinder means, link valve means engageable and actuable selectively by said stop means in dependence on the direction of movement of said moving part of said timing piston and cylinder means, a pressurized operating fluid source connected to said timing piston and cylinder means, to said feedback valve means and to said link valve means, fluid flow means connecting said link valve means to said actuating piston and cylinder means, first adjustable throttle means connected with and controlling the flow of fluid through said actuating piston and cylinder means in one direction of movement thereof, and pecking drive take-off means connected to said moving part of said actuating piston and cylinder means and to said working head transmitting the movement of said moving part of said actuating piston and cylinder means to said working head moving said working head towards and away from said working position.

7. In a machine tool including a working head, means mounting said head for working movement thereof and simultaneously for movement thereof towards and away from a working position; fluid operated timing piston and cylinder means, feedback valve means connected for controlled flow of fluid to said timing piston and cylinder means and actuable by the moving part of said timing piston and cylinder means for reversing the fluid flow through said timing piston and cylinder means, fluid distribution means connected to said timing piston and cylinder means distributing fluid in selectively reversible senses in response to the timed movement of said moving part of said timing piston and cylinder means, fluid operated, double-acting actuating piston and cylinder means, reversing valve means connecting said actuating piston and cylinder means to said fluid distribution means and responsive to the direction of fluid flow therein, floating piston means associated with and engageable by the moving part of said actuating piston and cylinder means in one direction of movement only thereof, liquid loading means connected with said floating piston means loading against movement in the direction in which said floating piston is engaged by said moving part of said actuating piston and cylinder means, a common pressurised fluid source connected to each said fluid operated part of said machine tool, and pecking drive take-off means tied to said moving part of said actuating piston and cylinder means and to said working head, said direction corresponding to movement of said working head towards its working position.

8. In a machine tool including a working head means mounting said head for working movement thereof and simultaneously for movement thereof towards and away from a working position; fluid operated timing piston and cylinder means, feedback valve means connected for controlled flow of fluid to said timing piston and cylinder means and actuable by the moving part of said timing piston and cylinder means for reversing the fluid flow through said timing piston and cylinder means, timing throttle means connected to said timing piston and cylinder means and to said feedback valve means controlling the rate of flow of fluid through said timing piston and cylinder means, fluid distribution means connected to said timing piston and cylinder means distributing fluid in selectively reversible senses in response to the timed movement of said moving part of said timing piston and cylinder means, fluid operated double-acting actuating piston and cylinder means, reversing valve means connecting said actuating piston and cylinder means to said fluid distribution means and actuable in response to the fluid flow sense therein, floating piston means associated with and engageable by the moving part of said actuating piston and cylinder means in one direction of movement only thereof, liquid loading means connected with said floating piston means loading against movement in the direction in which said floating piston is engaged by said moving part of said actuating piston and cylinder means and pecking drive take-off means tied to said moving part of said actuating piston and cylinder means and to said working head, said direction corresponding to movement of said working head towards its working position.

9. In a machine tool including a working head, means mounting said head for working movement thereof and simultaneously for movement thereof towards and away from a working position; a machine tool pecking device comprising a fluid operated, double-acting actuating piston and cylinder means, a fluid operated, double-acting timing piston and cylinder means, feedback valve means actuable by said moving part of said timing piston and cylinder means at the limits of movement thereof reversing the direction of movement of the moving part of said timing piston and cylinder means, stop means adjustably mounted on said moving part of said timing piston and cylinder means, link valve means actuable selectively by said stop means in dependence on the direction of movement of said moving part of said timing piston and cylinder means, a pressurised operating fluid soure connected to said timing piston and cylinder means, said feedback valve means and to said link valve means, fluid flow means connecting said link valve means to said actuating piston and cylinder means, first adjustable throttle means connected to and controlling the flow of fluid through said actuating piston and cylinder means in one direction of movement of said moving part thereof, second adjustable throttle means controlling the flow of fluid through said actuating piston and cylinder means in the other direction of movement of said moving part thereof, timing throttle means connected to and controlling the flow of fluid through said timing piston and cylinder means, and pecking drive take-off means connected to said moving part of said actuating piston and cylinder means and to said working head transmitting the movement of said moving part of said actuating piston and cylinder means to said working head moving said working head towards and away from said working position.

10. In a machine tool including a working head, means mounting said head for working movement thereof and simultaneously for movement thereof towards and away from a working position; common fluid operated timing piston and cylinder means, feedback valve means connected for controlled flow of fluid to said timing piston and cylinder means and actuable by the moving part of said timing piston and cylinder means for reversing the fluid flow through said timing piston and cylinder means, timing throttle means connected to said timing piston and cylinder means and to said feedback valve means controlling the rate of flow of fluid through said timing piston and cylinder means, fluid distribution means connected to said timing piston and cylinder means distributing fluid in selectively reversible senses in response to the timed movement of said moving part of said timing piston and cylinder means, at least one fluid operated, double-acting actuating piston and cylinder means, reversing valve means connecting said actuating piston and cylinder means to said fluid distribution means and responsive to the fluid flow sense therein, floating piston means associated with and engageable by the moving part of said actuating piston and cylinder means in one direction of movement only thereof, liquid loading means connected with said floating piston means loading against movement in the direction in which said floating piston is engaged by said moving part of said actuating piston and cylinder means, adjustable liquid bleed means connected to said liquid loading means controlling the loading on said floating piston in said loaded direction of movement thereof, a common pressurised fluid source connected to each said fluid operated part of said machine tool, and pecking drive take-off means tied to said moving part of said actuating piston and cylinder means and to said working head, said direction corresponding to movement of said working head towards its working position.

11. In a machine tool including a working head, means mounting said head for working movement thereof and simultaneously for movement thereof towards and away from a working position; common fluid operated timing piston and cylinder means, feedback valve means connected for controlled flow of fluid to said timing piston and cylinder means and actuable by the moving part of said timing piston and cylinder means for reversing the fluid flow through said timing piston and cylinder means, timing throttle means connected to said timing piston and cylinder means and to said feedback valve means controlling the rate of flow of fluid through said timing piston and cylinder means, fluid distribution means connected to said timing piston and cylinder means distributing fluid in selectively reversible senses in response to the timed movement of said moving part of said timing piston and cylinder means, at least one fluid operated double-acting actuating piston and cylinder means, reversing valve means connecting said actuating piston and cylinder means to said fluid distribution means, floating piston means associated with and engageable by the moving part of said actuating piston and cylinder means in one direction of movement only thereof, liquid loading means connected with said floating piston means loading against movement in the direction in which said floating piston is engaged by said moving part of said actuating piston and cylinder means, adjustable limit stop means associated with said floating piston means and limiting it movement in the direction reverse to said direction, system return means associated with said moving part of said actuating piston and cylinder means and actuable thereby at the limit of its total movement in the said direction, override means actuable by said return means returning said moving part of said actuating piston and cylinder means to the limit of its movement in said reverse direction, and pecking drive take-off means tied to said moving part of said actuating piston and cylinder means and to said working head, said direction corresponding to movement of said working head towards its working position.

12. In a machine tool including a working head, means mounting said head for working movement thereof and simultaneously for movement thereof towards and away from a working position; fluid operated timing piston and cylinder means, feed back valve means connected for controlled flow of fluid to said timing piston and cylinder means and actuable by the moving part of said timing piston and cylinder means for reversing the fluid flow through said timing piston and cylinder means, timing throttle means connected to said timing piston and cylinder means and to said feed back valve means controlling the rate of flow of fluid through said timing piston and cylinder means, fluid distribution means connected to said timing piston and cylinder means distributing fluid in selectively reversible senses in response to the timed movement of said moving part of said timing piston and cylinder means, fluid operated double-acting actuating piston and cylinder means, reversing valve means connecting said actuating piston and cylinder means to said fluid distribution means and actuable in response to the fluid flow sense therein, floating piston means associated with and engageable by the moving part of said actuating piston and cylinder means in one direction of movement only thereof, liquid loading means connected with said floating piston means loading against movement in the direction in which said floating piston is engaged by said moving part of said actuating piston and cylinder means, adjustble liquid bleed means connected to said liquid loading means controlling the loading on said floating piston in said loaded direction of movement thereof, liquid reservoir means connected to said liquid bleed means receiving liquid therefrom, single acting piston means tied to said moving part of said actuating piston and cylinder means and movable within said floating piston means, stop means mounted on said single acting piston means and engaging one end of said floating piston means in said direction, a common pressurised fluid source connected to each said fluid operated part of said machine tool and to said liquid reservoir means and pecking drive take off means tied to said moving part of said actuating piston and cylinder means and to said working head, said direction corresponding to movement of said working head towards its working position.

13. In a machine tool including a working head, means mounting said head for working movement thereof and simultaneously for movement thereof towards and away from a working position; common fluid operated timing piston and cylinder means, feedback valve means connected for controlled flow of fluid to said timing piston and cylinder means and actuable by the moving part of said timing piston and cylinder means for reversing the fluid flow through said timing piston and cylinder means, timing throttle means connected to said timing piston and cylinder means and to said feedback valve means controlling the rate of flow of fluid through said timing piston and cylinder means, fluid distribution means connected to said timing piston and cylinder means distributing fluid in selectively reversible senses in response to the timed movement of said moving part of said timing piston and cylinder means, at least two fluid operated double-acting actuating piston and cylinder means, reversing valve means connecting each said actuating piston and cylinder means to said fluid distribution means and responsive to the fluid flow sense therein, floating piston means associated with and engageable by the moving part of each said actuating piston and cylinder means in one direction of movement only thereof, liquid loading means connected with said floating piston means loading against movement in the direction in which said floating piston is engaged by said moving part of said actuating piston and cylinder means, single acting piston means tied to said moving part of said actuating piston and cylinder means, movable within said floating piston means, stop means mounted on said single acting piston means and engaging one end of said floating piston means in said direction, adjustable limit stop means associated with said floating piston means and limiting its movement in the direction reverse to said direction, system return means associated with said moving part of said actuating piston and cylinder means and actuable thereby at the limit of its total movement in the said direction, override means actuable by said return means returning said moving part of said actuating piston and cylinder means to the limit of its movement in said reverse direction, isolating means connected to said system return means and actuable thereby to isolate said actuating piston and cylinder means from said timing means, and pecking drive take-off means tied to said moving part of said actuating piston and cylinder means and to said working head, said direction corresponding to movement of said working head towards its working position.

14. In a machine tool including a working head, means mounting said head for working movement thereof and simultaneously for movement thereof towards and away from a working position; fluid operated timing piston and cylinder means, feedback valve means connected for controlled flow of fluid to said timing piston and cylinder means and a actuable by the moving part of said timing piston and cylinder means for reversing the fluid flow through said timing piston and cylinder means, timing throttle means connected to said timing piston and cylinder means and to said feedback valve means controlling the rate of flow of fluid through said timing piston and cylinder means, fluid distribution means connected to said timing piston and cylinder means distributing fluid in selectively reversible senses in response to the timed movement of said moving part of said timing piston and cylinder means, fluid operated double-acting actuating piston and cylinder means, reversing valve means connecting said actuating piston and cylinder means to said fluid distribution means and responsive to the fluid flow sense therein, floating piston means associated with and engageable by the moving part of said actuating piston and cylinder means in one direction of movement only thereof, liquid loading means connected with said floating piston means loading against movement in the direction in which said floating piston in engaged by said moving part of said actuating piston and cylinder means, adjustable liquid bleed means connected to said liquid loading means controlling the loading on said floating piston in said loaded direction of movement thereof, liquid reservoir means connected to said liquid bleed means receiving liquid therefrom, adjustable limit stop means associated with said floating piston means to limit its movement in the direction reverse to said direction, system return means associated with said moving part of said actuating piston and cylinder means and actuable thereby at the limit of its total movement in the said direction, override means actuable by said return means returning said moving part of said actuating piston and cylinder means to the limit of its movement in said reverse direction, floating piston return means connected to said system return means and to said liquid reservoir means and actuable by said system return means to return said floating piston means to the limit of its movement in the said reverse direction by forcing said liquid in said reverse direction through said liquid bleed means, isolating means connected to said system return means and actuable thereby to isolate said actuating piston and cylinder means from said timing means, flow means interconnecting said cylinder of said actuating piston and cylinder means with said single acting piston means to pressurise the same in unison in said direction, and pecking drive take-off means tied to said moving part of said actuating piston and cylinder means and to said working head, said direction corresponding to movement of said working head towards its working position.

15. In a machine tool including a working head, means mounting said head for working movement thereof and simultaneously for movement thereof towards and away from a working position; fluid operated self-sustaining timing means, fluid distribution means connected to said timing means and distributing fluid in selectively reversible senses in timed response to said timing means, fluid operated double-acting actuating piston and cylinder means, reversing valve means connecting said actuating piston and cylinder means to said fluid distribution means and responsive to the fluid flow sense therein, floating piston means associated with and engageable by the moving part of said actuating piston and cylinder means in one direction of movement only thereof, adjustable liquid loading means connected with said floating piston means loading against movement in the direction in which said floating piston is engaged by said moving part of said actuating piston and cylinder means and pecking drive take-off means tied to said moving part of said actuating piston and cylinder means and to said working head, said direction corresponding to movement of said working head to its working position.

16. In a machine tool including a working head, means mounting said head for working movement thereof and simultaneously for movement thereof towards and away from a working position; common fluid operated self sustaining timing means, fluid distribution means connected to said timing means and distribution fluid in selectively reversible senses in timed response to said timing means, at least one fluid operated, double-acting actuating piston and cylinder means, reversing valve means connecting said actuating piston and cylinder means to said fluid distribution means and responsive to the fluid flow sense therein, floating piston means associated with and engageable by the moving part of said actuating piston and cylinder means in one direction of movement only thereof, liquid loading means connected with said floating piston and loading against movement in the direction in which said floating piston is engaged by said moving part of said actuating piston and cylinder means, adjustable liquid bleed means connected to said liquid loading means controlling the loading on said floating piston in said loaded direction of movement thereof, liquid reservoir means connected to said liquid bleed means receiving liquid therefrom, single acting piston means tied to said moving part of said actuating piston and cylinder means, movable within said floating piston means, stop means mounted on said single acting piston means and engaging one end of said floating piston means in said direction, adjustable limit stop means associated with said floating piston means and limiting its movement in the direction reverse to said direction, system return means associated with said moving part of said actuating piston and cylinder means and actuable thereby at the limit of its total movement in the said direction, override means actuable by said return means returning said moving part of said actuating piston and cylinder means to the limit of its movement in said reverse direction, floating piston return means connected to said system return means and to said liquid reservoir and actuable by said system return means to return said floating piston means to the limit of its movement in said reverse direction by forcing said liquid in said reverse direction through said liquid bleed means, isolating means connected to said system return means and actuable thereby to isolate said actuating piston and cylinder means from said timing means, and pecking drive take-off means tied to said moving part of said actuating piston and cylinder means and to said working head, said direction corresponding to movement of said working head to its working position.

17. In a machine tool including a working head, means mounting said head for working movement thereof and simultaneously for movement thereof towards and away from a working position; common fluid operated timing piston and cylinder means, feedback valve means connected for controlled flow of fluid to said timing piston and cylinder means and actuable by the moving part of said timing piston and cylinder means for reversing the fluid flow through said timing piston and cylinder means, timing throttle means connected to said timing piston and cylinder means and to said feedback valve means controlling the rate of flow of fluid through said timing piston and cylinder means, fluid distribution means connected to said timing piston and cylinder means distributing fluid in selectively reversible senses in response to the timed movement of said moving part of said timing piston and cylinder means, at least two fluid operated double-acting actuating piston and cylinder means, reversing valve means connecting each said actuating piston and cylinder means to said fluid distribution means, floating piston means associated with and engageable by the moving part of each said actuating piston and cylinder means in one direction of movement only thereof, liquid loading means connected with said floating piston means loading against movement in the direction in which said floating piston is engaged by said moving part of said actuating piston and cylinder means, adjustable liquid bleed means connected to said liquid loading means controlling the loading on said floating piston in said loaded direction of movement thereof, liquid reservoir means connected to said liquid bleed means receiving liquid therefrom, single acting piston means tied to said moving part of said actuating piston and cylinder means and movable within said floating piston means, stop means mounted on said single acting piston means and engaging one end of said floating piston means in said direction, adjustable limit stop means associated with said floating piston means and limiting its movement in the direction reverse to said direction, system return means associated with said moving part of said actuating piston and cylinder means and actuable thereby at the limit of its total movement in the said direction, override means actuable by said return means returning said moving part of said actuating piston and cylinder means to the limit of its movement in said reverse direction, floating piston return means connected to said system return means and to said liquid reservoir and actuable by said system return means to return said floating piston means to the limit of its movement in the said reverse direction by forcing said liquid in said reverse direction through said liquid bleed means, isolating means connected to said system return means and actuable thereby to isolate said actuating piston and cylinder means from said timing means, a common pressurised fluid source connected to each said fluid operated part of said machine tool, and pecking drive take-off means tied to said moving part of said actuating piston and cylinder means and to said working head, said direction corresponding to movement of said working head to its working position.

No references cited.

FRANCIS S. HUSAR, *Primary Examiner.*